United States Patent
Duffy-Protentis

(10) Patent No.: US 11,618,542 B1
(45) Date of Patent: Apr. 4, 2023

(54) SYSTEMS AND METHODS FOR REFUELING AN ELECTRIC WATERCRAFT

(71) Applicant: JaccPro, LLC, Easton, MA (US)

(72) Inventor: Jack Patrick Duffy-Protentis, Worcester, MA (US)

(73) Assignee: JaccPro, LLC, Easton, MA (US)

( * ) Notice: Subject to any disclaimer, the term of this patent is extended or adjusted under 35 U.S.C. 154(b) by 0 days.

(21) Appl. No.: 17/900,086

(22) Filed: Aug. 31, 2022

(51) Int. Cl.
| | | |
|---|---|---|
| *B63H 21/38* | (2006.01) | |
| *H01M 50/204* | (2021.01) | |
| *H01M 50/249* | (2021.01) | |
| *H01M 10/48* | (2006.01) | |
| *H01M 10/42* | (2006.01) | |
| *B60L 50/60* | (2019.01) | |

(52) U.S. Cl.
CPC .......... *B63H 21/38* (2013.01); *H01M 10/425* (2013.01); *H01M 10/482* (2013.01); *H01M 50/204* (2021.01); *H01M 50/249* (2021.01); *B60L 50/60* (2019.02); *B60L 2200/32* (2013.01); *H01M 2010/4278* (2013.01); *H01M 2220/20* (2013.01)

(58) Field of Classification Search
CPC .. B63H 21/38; H01M 50/249; H01M 50/204; H01M 10/425; H01M 10/482; H01M 2010/4278; H01M 2220/20; B60L 50/60; B60L 2200/32
See application file for complete search history.

(56) References Cited

U.S. PATENT DOCUMENTS 8,535,104 B1 * 9/2013 Nida .................... B63H 21/383
62/3.61

* cited by examiner

*Primary Examiner* — Carlos Amaya
(74) *Attorney, Agent, or Firm* — Caldwell Intellectual Property Law

(57) ABSTRACT

Aspects of the present disclosure are directed to a method of refueling an electric watercraft. The method may include detecting, by one or more sensors, an unlock signal as a function of unlocking a first battery pack from a first receiver, receiving, by a computing device, the unlock signal, and disabling, by the computing device, the first battery pack and a second battery pack simultaneously, in response to receiving the unlock signal. Disabling the first battery pack and the second battery pack may further include disabling the first battery pack using a first contactor and the second battery pack using a second contactor. Aspects of the present disclosure may also be direct to a system for refueling an electric watercraft.

20 Claims, 7 Drawing Sheets

SYSTEMS AND METHODS FOR REFUELING AN ELECTRIC WATERCRAFT

FIELD OF THE INVENTION

The present invention generally relates to the field of watercraft. In particular, the present invention is directed to systems and methods for refueling an electric watercraft.

BACKGROUND

Electric watercrafts hold great promise in their ability to run using sustainably sourced energy, without increased atmospheric carbon associated with burning of fossil fuels. Downsides associated with electric watercraft may include poor energy storage and therefore range of operation.

SUMMARY OF THE DISCLOSURE

In an aspect, a method of refueling an electric watercraft, the method including detecting, by one or more sensors, an unlock signal as a function of unlocking a first battery pack from a first receiver and receiving, by a computing device, the unlock signal. The method may further include disabling, by the computing device, the first battery pack and a second battery pack simultaneously, in response to receiving the unlock signal, wherein disabling the first battery pack and the second battery pack further comprises: disabling the first battery pack using a first contactor and the second battery pack using a second contactor.

In another aspect, a system for refueling an electric watercraft may include one or more sensors, the one or more sensors configured to detect an unlock signal as a function of unlocking a first battery pack from a first receiver. The system may further include a computing device, the computing device communicatively connected to the one or more sensors, and wherein the computing device is configured to receive the unlock signal and disable the first battery and a second battery pack simultaneously, in response to receiving the unlock signal. Disabling the first battery pack and the second battery pack may include disabling the first battery pack using a first contactor and the second battery pack using a second contactor.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to a system for refueling an electric watercraft. System may include one or more sensors and a computing device. One or more sensors may be configured to detect an unlock signal. Computing device may be communicatively connected to one or more sensors. Computing device may be configured to receive an unlock signal and disable battery packs, in response to receiving the unlock signal. In some cases, a plurality of battery packs may be disabled substantially simultaneously as a function of unlock signal.

Aspects of the present disclosure can be used to quickly interchange one or more battery packs of an electric watercraft. Aspects of the present disclosure can also be used to simultaneously enable or disable one or more battery packs disposed within an electric watercraft. In some cases, enabling or disabling of a plurality of battery packs despised within an electric watercraft may be in response to a user performing a locking or unlocking maneuver.

Aspects of the present disclosure allow for increased electric watercraft use and decreased electric watercraft downtime from charging. In some embodiments, battery packs may automatically disable when unlocked from electric watercraft receiver. Exemplary embodiments illustrating aspects of the present disclosure are described below in the context of several specific examples.

Figure 1:
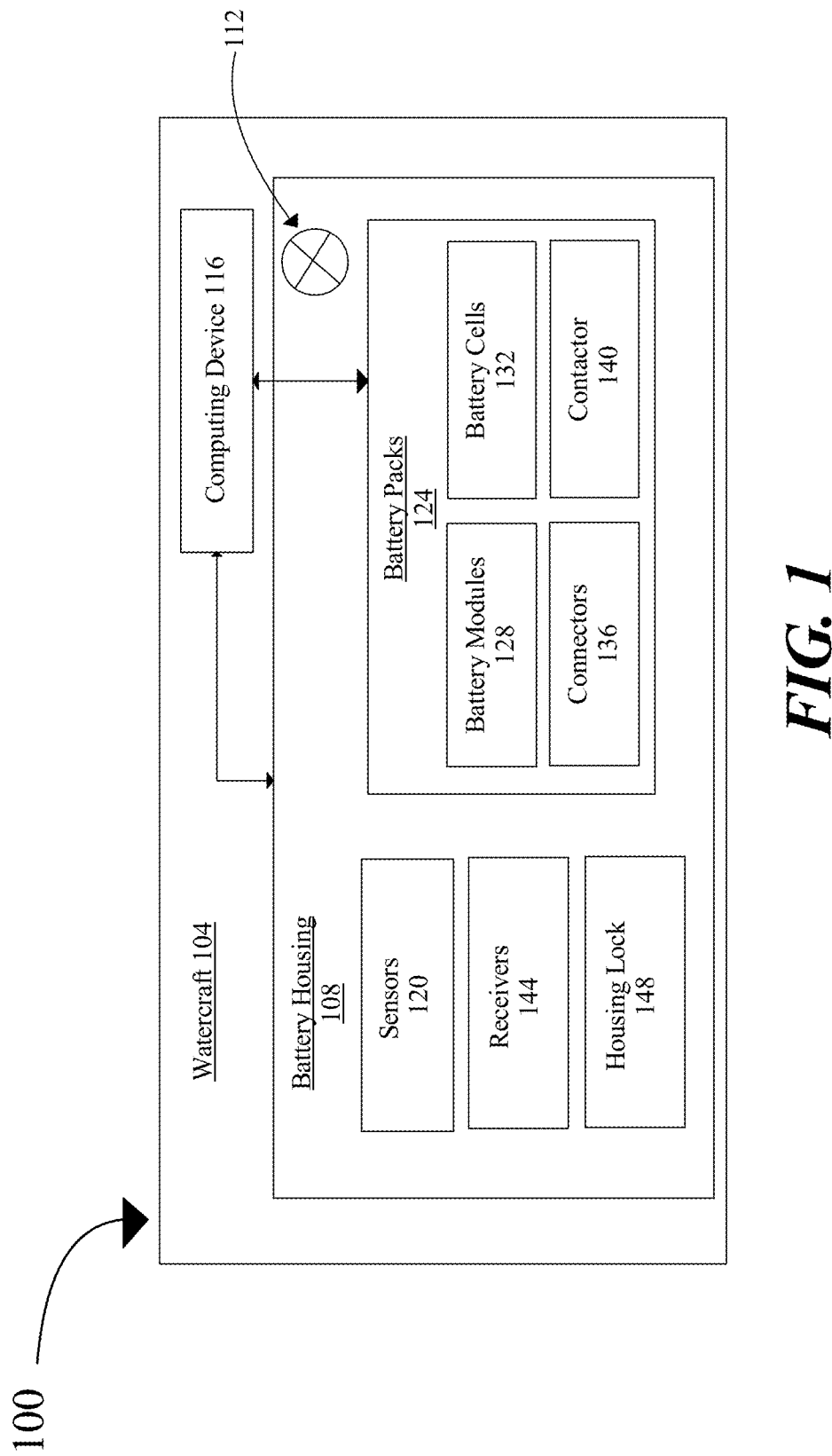
FIG. 1 is a block diagram of an exemplary electric watercraft, in accordance with an embodiment.

Referring now to FIG. 1, a system 100 for refueling an electric watercraft 104 is shown. As used in this disclosure, "electric watercraft" 104 is a vehicle propelled through water using an electric power source. An electric watercraft may be propelled by a propulsor. As used in this disclosure, a "propulsor" is any device configured to generate propulsion within a surrounding medium (e.g., fluid medium). Electric watercraft 104 may include, but is not limited to, boats, personal watercraft, unmanned watercraft, submarines, jet-propelled personal watercrafts, and the like. In some instances, electric watercraft 104 is a personal watercraft, such as a jet-propelled personal watercraft, a water hovercraft, or the like. In a non-limiting example, a personal watercraft may be a jet-propelled personal watercraft. A jet-propelled personal watercraft may be propelled by an impeller. In a non-limiting example, a personal watercraft may be a personal watercraft propelled by a propeller. In some cases, a personal watercraft, such as a jet-propelled personal watercraft, may be maneuvered by directing a jet or flow of water from an impeller, propeller, or any combination thereof.

In some embodiments, electric watercraft 104 may accommodate one or more individuals. In some cases, electric watercraft 104 may be structured such that one or more individuals may be able to ride, mount, or enter the electric watercraft 104. In some instances, electric watercraft 104 may be operated by a single individual. In some instances, electric watercraft 104 may include a steering input that enables an individual to control a direction in which the electric watercraft 104 travels. Additionally, electric watercraft 104 may include a motor receiving power from a power source. In particular, a power source may be an electric power source. That is, a power source may generate electric power by the means of a battery or any suitable electric power source.

Continuing to refer to FIG. 1, electric watercraft 104 may include a battery housing 108. "Battery housing," as described herein, is a compartment that contains at least one battery pack. In some cases, battery housing 108 may be sealed by a cap or cover. Battery housing 108 may be located on any portion of electric watercraft 104. In some embodiments, battery housing 108 may be located within close proximity to a motor of electric watercraft 104. In some cases, electric watercraft 100 may include a plurality of battery housings 108 (e.g., at least two, at least four, at least eight, at least twelve, or the like) with each battery housing containing a battery pack. In some cases, battery housing 108 may be located beneath a deck of watercraft 104. Battery housing may be covered by at least a portion of deck of watercraft 104. Battery housing 108 may be a recess of an exterior structure of electric watercraft 104 enclosed by a cap or cover. In some instances, battery housing 108 may have a fluid outlet 112 that enables fluids to be removed from battery housing 108. Fluid outlet 112 may include, without limitation, a valve and/or an actuatable opening, or the like. For example, in some cases, if water enters a battery housing 108, fluid outlet 112 may enable drainage of the water from the battery housing 108. Water may drain from fluid outlet 112 to a bilge, a deck, or overboard. In some cases, fluid outlet 112 may be communicatively connected to a computing device 116 (described in more detail below) that may send a signal to at least a component of fluid outlet 112 to open or close, thereby facilitating controlled draining. In some embodiments, fluid outlet 112 may be utilized to create a vacuum within battery housing 108. For example, fluid outlet 112 may be fluidly connected to a vent, pipe, conduit, or anything of the like, such that air may be pushed and/or pulled therethrough. In some cases, venting of battery housing 108 may facilitate draining of water with fluid outlet 112. In some cases, computing device 116 may send a signal to open fluid outlet 112 causing air to be vented into and/or out of battery housing 108. In some embodiments, fluid outlet 112 may include a pump. In some cases, fluid (e.g., air, water, and the like) may be actively pumped from battery housing 108. This may enable battery housing 108 to be at least partially evacuated (i.e., at a pressure below atmosphere). Where battery housing 108 is at least partially evacuated, humidity (including humidity within air) will be less likely to affect contents of battery housing 108.

Pump may include a substantially constant pressure pump (e.g., centrifugal pump) or a substantially constant flow pump (e.g., positive displacement pump, gear pump, and the like). Pump can be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with at least a reservoir. In some cases, reservoir may be unpressurized and/or vented. Alternatively, reservoir may be pressurized and/or sealed.

As used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, system 100 may perform one or more signal processing steps on a signal. For instance, system 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued, and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Continuing to refer to FIG. 1, battery housing 108 may include one or more battery packs 124. It should be noted that each battery pack 124 may be associated with a computing device (e.g., each battery pack may include at least a controller and/or processor local to the battery pack). In some cases, each battery pack 124 may have a localized computing device that operates similarly or the same as any computing device described in this disclosure. Furthermore, in some cases a computing device as described in this disclosure may be distributed, and for example, include an aggregate of computing devices (e.g., local to different battery packs). For example, a first battery pack 124 may have a first computing device, a second battery pack 124 may have a second computing device, and so on. It should be appreciated that localized computing devices may communicate with other localized computing devices. In some instances, each localized computing device may communicate with a centralized computing device 116. In some cases, a centralized computing device may be located on personal watercraft.

Continuing to refer to FIG. 1, battery packs 124 may include at least a sensor 120. Sensor 120 may include any sensor described in this disclosure. At least a sensor 120 may be configured to detect various conditions of battery packs 124 surrounding. Additionally, at least a sensor may be configured to detect internal conditions of a battery packs 124 including but not limited to, state of charge (SoC), state of health (SoH), useful energy remaining, useable power available, current, potential, resistance, temperature, pressure, operational status, and the like.

Continuing to refer to FIG. 1, in some embodiments, localized computing devices may be in communication by way of at least a communication network. Communication network may include any network or protocol described in this disclosure, for example without limitation controller area network (CAN), local area network (LAN), wide area network (WAN), Wi-Fi, wireless networks, serial communications, parallel communications, and the like. In some cases, battery packs 124 may communicate by way of controller area network bus communicatively connected to battery packs 124 and/or electric watercraft 104. A "controller area network bus," as used in this disclosure, is a communication bus for a controller area network. Controller area network (CAN) bus may include physical circuit elements that may use, for instance and without limitation, twisted pair, digital circuit elements/FGPA, microcontroller, or the like to perform, without limitation, processing and/or signal transmission processes and/or tasks; circuit elements may be used to implement CAN bus components and/or constituent parts as described in further detail below. CAN bus units may include multiplex electrical wiring for transmission of multiplexed signaling. CAN bus units may include message-based protocol(s), wherein the invoking program sends a message to a process and relies on that process and its supporting infrastructure to then select and run appropriate programing. CAN bus units located physically on electric watercraft 104 may include mechanical connection to the watercraft, wherein the hardware of the CAN bus units is integrated within the infrastructure of electric watercraft 104. In some embodiments, hardware of the CAN bus units may include a plurality of microcontrollers, each communicatively connected to a battery pack 124. CAN bus units may be communicatively connected to the watercraft and/or with a plurality of devices outside of the watercraft, as described in further detail below.

With continued reference to FIG. 1, in some embodiments, battery packs 124 may include one or more battery modules 128 and one or more battery cells 132. In some instances, battery cells 132 may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Battery modules 128 and/or battery cells 132 may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Battery cells 132 may include lithium metal batteries. Battery cells 132 may include lead-based batteries such as without limitation lead acid batteries and lead carbon batteries. Battery cells 132 may include lithium sulfur batteries, magnesium ion batteries, and/or sodium ion batteries. Batteries may include solid state batteries or supercapacitors or another suitable energy source. Batteries may be primary or secondary or a combination of both.

With continued reference to FIG. 1, in an embodiment, battery cells 132 may be an absorbent glass mat (AGM) battery. As used in this disclosure, an "absorbent glass mat battery" is a type of a valve regulated lead-acid (VRLA) battery. In some cases, valve regulated lead-acid battery may limit amount of electrolyte absorbed in a plate separator, wherein the plate separator may include a positive plate and a negative plate which facilitate oxygen recombination within battery cell. In an embodiment, valve regulated lead-acid battery may further form absorbed electrolyte into a gel. In another embodiment, valve regulated lead-acid battery may include a relief valve, wherein the relief valve may retain plurality of components within valve regulated lead-acid battery in independent positions. In some embodiments, absorbent glass mat battery may include a fiberglass mesh, wherein the fiberglass mesh may be placed between positive plate and negative plate. In some cases, fiberglass mesh may include electrolyte and separate positive plate and negative plate. Further, Positive plate and/or negative plate may be in any shape such as, without limitation, flat, bent, rolled, and the like thereof. In some embodiments, absorbent glass mat battery may be mounted in any orientation. Additionally, or alternatively, absorbent glass mat battery may be maintenance-free. As used in this disclosure, "maintenance-free" means no constant maintenance required, but cleaning and/or regular function testing is still required. In other embodiments, absorbent glass mat battery may resist self-discharging within a wide range of temperatures. Battery packs 124 may be communicatively connected to a computing device 116. At a high level, battery packs 124 may be electrically connected to a motor of electric watercraft 104. That is, battery packs 124 may provide power to a motor of electric watercraft 104 to propel the electric watercraft 104. Further, battery packs 124 may provide power to various components of electric watercraft 104, including but not limited to, a display, light fixtures, indicators, electrical components, a horn, mechanical systems, computers, or the like.

With continued reference to FIG. 1, in some embodiments, battery packs 124 may include one or more battery connectors 136. Battery connectors 136 may establish electrical connectivity between battery packs 124 and electric watercraft 104. Battery connectors 136 may facilitate any energy transfer from battery modules 128 and/or battery cells 132 to various electrical components of the electric watercraft 104. In some embodiments, battery connectors 136 may be high voltage connectors. That is, battery connectors 136 may be able to withstand high voltages without compromising structural integrity of battery connectors 136. Further, battery connectors 136 may be formed with insulators capable of withstanding high voltage power transmissions. For example, battery connectors 136 may be made from glasses, porcelain, or any composite polymer material. More specifically, battery connectors 136 may be made from sulfur hexafluoride (SF6), epoxy, two-part silicone, one-part silicone, clay, quartz, alumina, feldspar, or any suitable insulator. In some embodiments, battery connectors 136 may be a pogo pin. That is, battery connectors 136 may be structured such that a helical spring within a pin applies a constant normal force against the back of a contact plate; counteracting any unwanted movement that may cause a lapse in connection. It should be noted that battery connectors 136 may facilitate electrical energy transfer to electric watercraft 104 when battery packs are installed within battery housing 108.

Continuing to refer to FIG. 1, battery packs 124 may include a contactor. A "contactor," as described herein, is an electrical component that may be opened to disable the circuit or closed to enable the circuit. For example, contactor 140 may include, a transistor, a relay, a solid-state relay, mechanical switch, circuit breaker, or the like. Structurally, each connector 136 may include a contactor 140. In some embodiments, contactor 140 may disconnect an electrical connection between battery connectors 136 and battery cells 132. In another embodiment, contactor 140 may make an electrical connection between connectors 132 and battery cells 132. In some instances, contactor 140 may be in communication with a computing device 116. Computing device 116 may send at least a signal (e.g., command signal) to contactor 140 to either enable battery connectors 136 or disable battery connectors 136. Signals sent from computing device 116 may be dependent on various factors of battery housing 108. For example, as mentioned above, water may accidentally enter battery housing 108 from outside of battery housing 108. As such, sensors 120 may send an indication to a computing device 116 that indicates the presence of water in battery housing 108. In response to receiving indication, computing device 116 may send a signal to contactor 140 to disconnect a connection between battery connectors 136 and battery cells 132. Advantageously, this may reduce fire hazard risk attending moisture proximal a high voltage connector. In some cases, computing device 116 may trigger contactor 140 in response to receiving any signal from sensors 120 that indicate a potential malfunction and/or error in electric watercraft 104. That is, contactor 140 may disconnect battery connectors 136 from battery cells 132 in response to at least a detection by sensors 116.

With continued reference to FIG. 1, battery housings 108 may include one or more battery receivers 144. Battery receivers 144 may be physically connected to battery housing 108. As used in this disclosure, a "battery receiver" is a mechanical component that receives at least a portion of a battery pack. In some cases, a battery receiver 144 may include an electrical connection to connect with battery pack. For example, battery receivers 144 may include a female and/or male connection port physically connected to an internal wall of battery housing 108. In some embodiments, battery receivers 144 may receive battery connectors 136. In some instances, battery connectors 136 may have a male terminal connection fitted to a female connection port of battery receivers 144, or vice versa. In some embodiments, battery receivers 144 may be communicatively connected to a computing device 116. In some cases, battery receivers 144 may include contactors configured to receive signals from a computing device 116 that may cause battery receivers' 144 contactors to interrupt any electrical current from battery connectors 136. For example, as a fail-safe, contactors of battery receivers 144 may create an electrical block in the event of a battery contactor 140 being unresponsive to signals from a computing device 116.

With continued reference to FIG. 1, in some embodiments, sensor 120 may be communicatively connected to battery receiver 144. Sensor 120 may include a battery lock sensor. Battery lock sensor may be configured to detect if a battery pack 124 is locked or unlocked. In some cases, battery pack 124 may be locked using a lock associated with one or more of battery receiver 144 and/or battery housing. Sensor 120 may include, without limitation, sensors suitable for detecting phenomena associated with locking and/or unlocking of a battery pack, including without limitation a switch, a microswitch, a continuity sensor, a proximity sensor, a strain gauge, a voltage meter, a current meter, an Ohm meter, a capacitance sensor, and the like. In some cases, when a battery pack 124 is locked, a locked signal (optionally by way of computing device 116) engages the battery pack's contactor 140 allowing electrical conduction between the battery pack 124 and electric watercraft 104. Conversely, in some cases, when a battery pack 124 is unlocked an unlock signal (optionally by way of computing device 116) disengages the battery pack's contactor 140 de-energizing the battery pack's connectors 136. Typically, sensor 120 will detect if battery pack is locked/unlocked and transmit a corresponding lock/unlock signal.

Continuing to refer to FIG. 1, battery housing 108 may include a housing lock 148. Housing lock 148 may be a system including a seal and a cap. A seal of housing lock 148 may be disposed between a recess of battery housing 108 and an external side of battery housing 108. A cap may be brought in abutment with a seal of housing lock 148. That is, a cap may apply pressure to a seal to prevent any fluid from entering battery housing 108. In some embodiments, housing lock 148 may be communicatively connected to a computing device 116. In some cases, computing device 116 may detect signals from sensor 120 and/or housing lock 148 indicating that housing lock 148 is locked (i.e., a cap applying pressure to a seal) or unlocked (e.g., open) (i.e., a cap releasing pressure applied to a seal).

Still referring to FIG. 1, in some embodiments, a computing device 116 may receive an unlock signal from sensors 116. In some embodiments, unlock signal may be in response to sensors 120 detecting a potential hazard, for instance within battery housing 108. In some embodiments, sensor 120 may be coupled to battery pack 124. Sensor 120 may be configured to measure a battery pack metric. Exemplary non-limiting battery pack metrics include state of charge (SoC), state of health (SoH), temperature, resistance, current, potential, resistance, and the like. Battery pack metrics may be detected from at least a battery cell 132. In some embodiments, unlock signal may be in response to sensors 120 detecting a battery pack metric of a battery cell is below a battery pack metric threshold. Battery pack metric may represent a current condition of battery pack 124. A current condition of battery pack 124 may depend on various factors including, but not limited to, a state of charge and/or a state of health of each installed battery pack 124, humidity, battery waste and/or ejecta, introduction of various substances, or any other condition that will affect the transmission of electric power from battery pack 124. In some cases, battery pack metric threshold may be determined prior to operation of electric watercraft 104. Battery pack metric threshold may be predetermined. A manufacturer of electric watercraft 104 or a manufacturer of battery packs 124 may determine a battery pack metric range needed to operate electric watercraft 104. Thus, when sensor 120 detect that a battery pack 124 has a battery pack metric outside of a battery pack metric range, sensor 120 and/or computing device 116 (in response to sensor) may transmit an unlock signal, thereby disconnecting the battery pack contactor 140.

Still referring to FIG. 1, in some embodiments, battery packs 124 may be disabled from transmitting electrical energy to battery receivers 144 and/or electric watercraft 104. Computing device 116 may receive an unlock signal/ lock signal from sensors 120 and in response to receiving the unlock signal/lock signal, computing device 116 may send a signal to disable/enable a contactor 140. In some cases, contactor 140 may be opened such that a circuit is disrupted, and no electrical power is transmitted from battery packs 124 through battery connectors 136 to electric watercraft 104, when the battery pack is unlocked. Signals sent from sensor 120 and/or housing lock 148 to computing device 116 may be in response to housing lock position.

Still referring to FIG. 1, in some embodiments, battery packs 124 may be unlocked (e.g., disengaged) from battery receivers 144 by a user. In some instances, housing lock 148 may be unlocked in parallel with battery packs 124. In some cases, battery receivers 144, housing lock 148, or any combination thereof, may unlock battery packs 124 and/or relieve applied pressure on a seal of housing lock 148. Further, unlocking housing lock 148 may release pressure from battery housing 108. In some embodiments, battery housing 108 may be a vacuum when sealed by housing lock 148 but may achieve atmospheric pressure when housing lock 148 is unlocked.

Still referring to FIG. 1, in some embodiments, battery packs 124 may be locked to battery receivers 144. In some cases, battery packs 124 may connect to battery receivers 144 at least partially by way of battery connectors 136. In some instances battery connectors 136 may be high-voltage connectors. In some embodiments, battery packs 124 may be installed charged (e.g., SoC greater than 50%, greater than 75%, greater than 90%, or the like). As described herein, a "charged battery pack" is a battery pack with an SoC greater than an SoC threshold. For example, an SoC threshold may be twenty-five percent. In some instances, electric watercraft 104 may use electrical energy from a battery pack until the SoC is below an SoC threshold (e.g., less than 50%, less than 25%, less than 10%, or the like). Sensor 120 may detect SoC of battery pack and send a signal to computing device 116 representative of the SoC. Computing device 116 may log, display, and/or use for calculation a received SoC.

Still referring to FIG. 1, in some embodiments, charged battery pack 124 may be locked into battery receivers 144 by a user. Lock signal may be sent by computing device 116 in response to sensor 120 detecting battery pack 120 being locked. Further, lock signal may be sent by computing device 116 in response to computing device 116 receiving data from various components of electric watercraft 104. It should be noted that multiple battery packs 124 may be locked and/or unlocked at the same time. Further, multiple battery packs 124 may be used at the same time. That is, electrical energy may be extracted from multiple battery packs 124 in parallel or series.

Still referring to FIG. 1, in some embodiments, an electric watercraft may include multiple modes. For example, electric watercraft may be in a "normal" mode. However, an individual may toggle the mode of operation to "sport" where more power may be supplied to motor and various handling components of electric watercraft 104. Alternatively or additionally, electric watercraft may include an "economy" mode where power is rationed to motor.

Continuing to refer to FIG. 1, charged battery packs 124 may be enabled by contactor 140. In some embodiments, a computing device 116 may send a signal to contactor 140 to close such that an electrical circuit is closed and operable.

Continuing to refer to FIG. 1, a user may unlock and/or lock battery packs 124 within battery housing 108. That is, a user may manually dislodge one or more battery packs 124 and replace them with one or more charged battery packs 124. For example, battery housing 108 may include eight battery packs 124. Continuing with the example, two of the eight battery packs 124 may have an SoC below a certain threshold; meaning they may need to be replaced. A user may unlock each battery pack 124 of the two aforementioned battery packs 124, or all eight battery packs 124. As at least a battery pack 124 is unlocked, one or more sensors 120 may detect the at least an unlocked battery pack. In response to sensors 120 detecting one or more battery packs 124 being unlocked, the sensors 120 may send an indication to computing device 116. Computing device 116 may then send a signal to battery packs 124 to disable a contactor 140 in one, some, or all of the installed battery packs 124. Additionally or alternatively, sensors 120 may send an indication directly to battery packs 124 to disable/enable a contactor 140 in one, some, or all of the installed battery packs 124. In some embodiments, all installed battery packs 124 may be electrically disconnected when at least one installed battery pack 124 is being replaced. Advantageously, this may prevent any electrical short circuits, malfunctions of electric watercraft 104, adverse events including a user, or the like.

Still referring to FIG. 1, in some embodiments, fluid outlet 112 may vent battery ejecta from battery housing 108, for instance in the case of thermal runaway or to prevent thermal runaway. Battery may produce battery ejecta while during or prior to thermal runaway. Battery ejecta may be any solid, liquid, or gas that emitted from a battery during thermal runaway. Battery ejecta may be hazardous by nature. In some cases, sensors 120 disposed proximate to fluid outlet 112 may detect battery waste or any other substance. If the substance is determined to be hazardous or detrimental to operation of electric watercraft 104, a computing system may receive an indication indicating a problem in battery housing 108. In some instances, an indication of a problem within battery housing 108 may cease operation of electric watercraft 104. In some embodiments, fluid outlet 112 may have a separate conduit for ejecta, such that ejecta does not mix with any dispelled air or water. In some cases, ejecta may be vented away from battery housing substantially away from users and/or passengers (e.g., passenger compartment, seat, or the like) of electric watercraft. In some cases, ejecta may include a lithium composition (where battery pack includes a lithium battery cell). Lithium ejecta may be extremely hot (e.g., greater than 1000° F.). In some cases, fluid outlet 112 may be configured to vent high temperature lithium ejecta in the case of thermal runaway. For instance, fluid outlet 112 may be comprise a high temperature material, such as without limitation titanium, stainless steel, or carbon fiber.

Still referring to FIG. 1, in some embodiments, sensors 120 may detect waste and/or eject by detecting an amount of substance. For example, sensors 120 may detect an amount of battery ejecta above a threshold amount of battery ejecta. The threshold amount of battery ejecta may be predetermined by an individual (i.e., by inputting the threshold) or by the battery's manufacturer. Continuing the example, sensors 120 may detect an amount of battery ejecta, send an indication of the amount of battery ejecta to a computing device 116, and computing device 116 may compare the amount of battery ejecta to a threshold amount of battery ejecta. In some instances, the amount of battery ejecta may be above the threshold amount. In response to the amount of battery ejecta being above the threshold amount, the computing device 116 may cease operation of electric watercraft 104. In other instances, amount of battery ejecta may be below a threshold amount of battery ejecta. In response to amount of battery ejecta being below threshold amount, a computing device 116 may send a signal to open outlet 112 to allow for battery ejecta to be dispelled. In should be noted that, as described herein, "cease operation" may not be an immediate stop. In some instances, electric watercraft 104 may receive an indication of time remaining before power from a battery is terminated. That way an individual may navigate back to a docking station before power is terminated.

Figure 2:
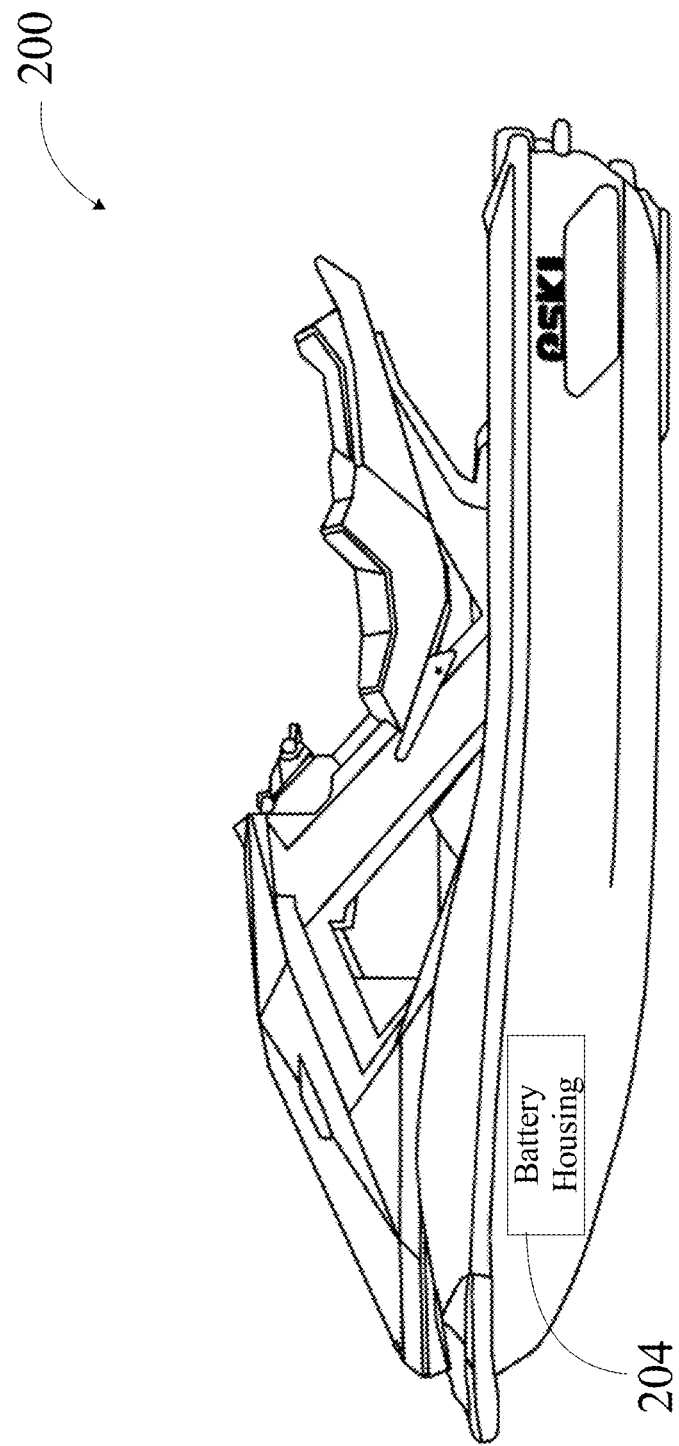
FIG. 2 illustrates an exemplary embodiment of an electric watercraft, in accordance with an embodiment.

Now referring to FIG. 2, an exemplary embodiment of an electric watercraft 200 is shown. Electric watercraft 200 may include battery housing 204. In some embodiments electric watercraft 200 may be in operation. In another embodiment, electric watercraft 200 may not be in operation. As described herein, an electric watercraft is "in operation" when a system or motor of the electric watercraft 200 is running.

With continued reference to FIG. 2, watercraft 200 may include a battery housing 204. It should be noted that battery housing 204 may be similar or the same as battery housing 108 as described herein. Further, battery housing 204 may be located on any portion of electric watercraft 104. Battery housing 204 may be on a left side, right side, rear, or front end. In some instances, battery housing 204 may be internal. That is, a cap of housing lock 148 may be visible from an outside perspective of electric watercraft 104. In some instances, electric watercraft 200 may include multiple battery housings 204. Multiple battery housings 204 may be disposed in various locations around electric watercraft 200. In some embodiments, a battery housing 204 may disposed in an internal cavity of electric watercraft 200. In other embodiments, battery housings 204 may be disposed alongside one another on an exterior of electric watercraft 200. In some embodiments, electric watercraft 200 may receive electric power from battery packs located within multiple battery housings 204.

Figure 3A:
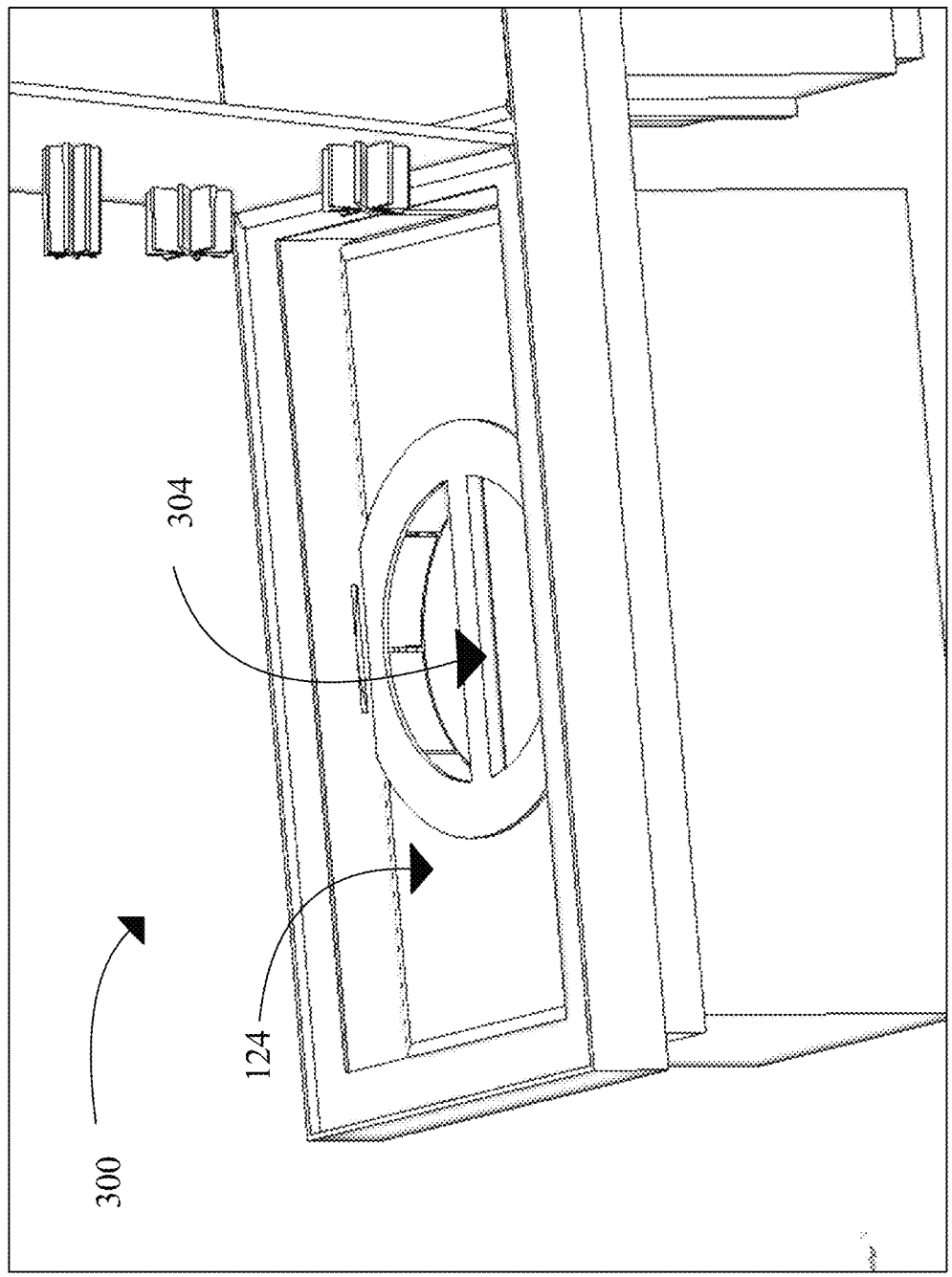
FIG. 3A illustrates an exemplary battery housing, in accordance with an embodiment.

Now referring to FIG. 3A, an exterior perspective of a battery housing 300 including battery packs is illustrated. As shown, battery housing 300 may include a battery pack 124 and a housing lock 304. Although battery cells 132 are not show explicitly in FIG. 3, it should be noted that battery pack 124 may include a plurality of battery cells 132 and that the battery pack 124 may be contained within battery housing 300. Battery pack 124 may extend into a depth of battery housing 300. In some embodiments, battery housing 300 may include a battery pack 124, sensor 120, and/or a housing lock 304 communicatively connected to a communication network, a computing device, or the like. For example, in some cases, a user may unlock a housing lock 304. This may be detected by one or more sensors in sensed communication with the housing lock 304, battery pack 124, and/or battery housing 300. In response to detecting an unlock, one or more sensors may transmit an indication to a computing device. In some cases, computing device may communicate by way of at least a network to a plurality of battery packs 124 in a plurality of battery housings 300, signaling to disable contactors in each battery pack. In some instances, one or more sensors may transmit an indication to microcontrollers connected to battery packs 124. In some embodiments, upon detecting housing 300, battery pack 124, and/or housing lock being unlocked, one or more sensors may transmit an indication to each computing device of each battery pack 124, respectively. Disabling each battery pack 124 may include disabling a contactor of each battery pack 124.

Continuing with FIG. 3A, locking one, some, or all battery packs, battery housings 300, and/or housing locks may enable battery packs 124 disposed therein. In some cases, a user may lock a battery pack, a battery housing, and/or a housing lock 304. Locking may be detected by one or more sensors disposed in sensed communication with battery pack, battery housing, and/or housing lock 304. In response to detecting housing 300 being locked, one or more sensors may transmit an indication to a computing device. Computing device may then enable one, some, or all battery packs 124. In some instances, one or more sensors may transmit an indication to individual computing devices located within battery packs 124. As mentioned above, each computing device may be connected to one battery pack 124 in battery housing 300. In some embodiments, upon detecting one, some, or all battery packs are locked, one or more sensors may transmit an indication to each computing device communicatively connected to each battery pack 124, respectively. The indication may cause one, some or all computing devices to enable each connected battery pack 124. Enabling each battery pack 124 may include enabling a contactor of each battery pack 124.

Figure 3B:
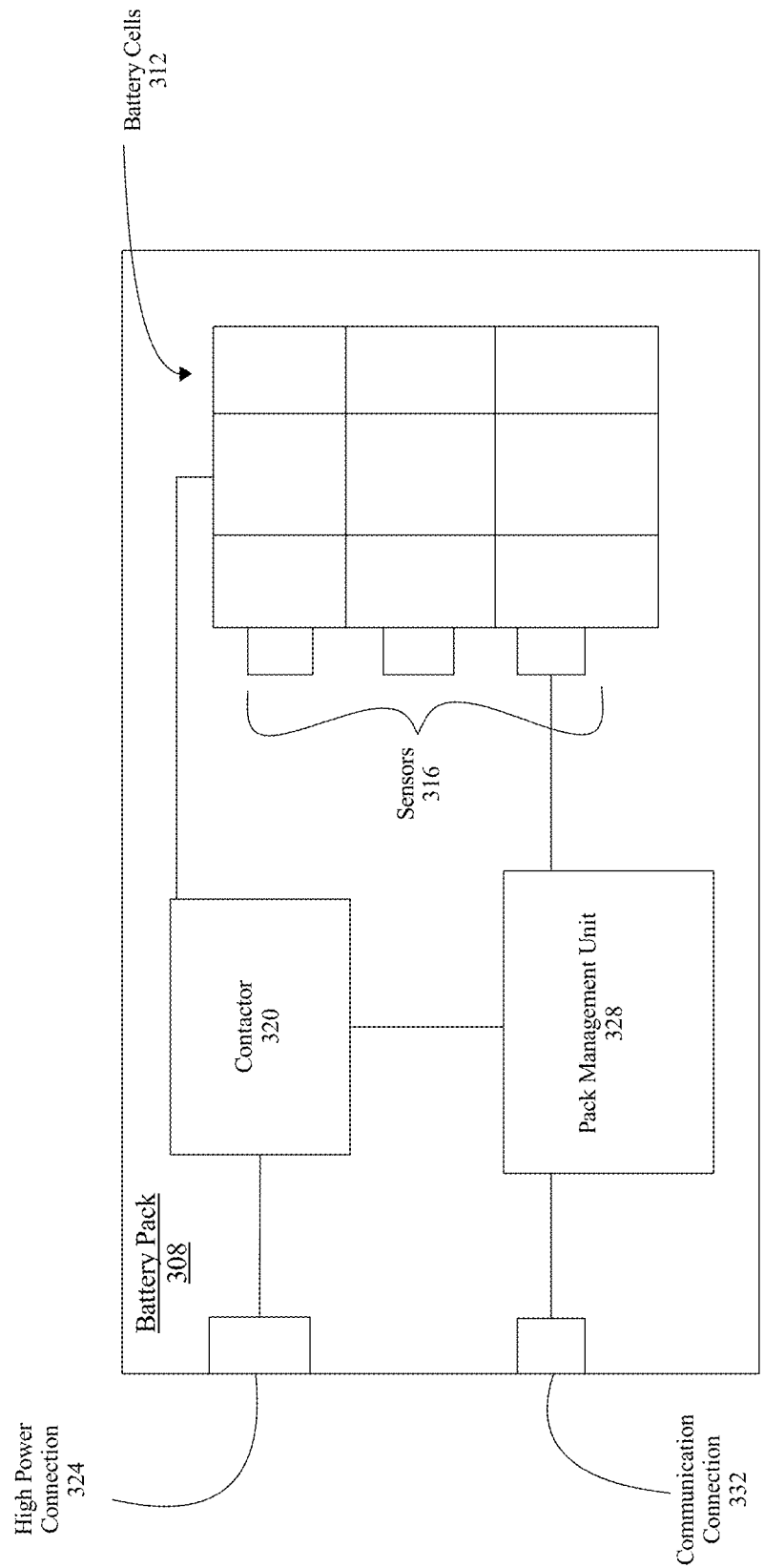
FIG. 3B illustrates an exemplary battery pack, in accordance with an embodiment.

Referring now to FIG. 3B, an exemplary battery pack 308 is illustrated in a block diagram. Battery pack 308 may include a plurality of battery cells 312 monitored by one or more sensors 316. Battery cells 312 may be electrically connected to contactor 320. In some embodiments, contactor 320 may enable and disable connectors that facilitate electrical energy transfer between battery cells 312 and a high-power connection 324 in response to receiving a signal from a pack management unit (PMU) 328. As a non-limiting example, PMU 328 may receive an indication that an adjacent battery pack is being removed from a battery housing. In response to receiving the indication, PMU 328 may send a signal to contactor 320 to disable one or more electrical connections between battery cells 312 and high-power connection 324. In some instances, the indication may be received from a communication connection 332. Communication connection 332 may be any suitable connection capable of facilitating transmission of signals.

Still referring to FIG. 3B, as another non-limiting example, PMU 328 may receive an indication from communication connection 332 indicating that battery pack 308 is being connected to a battery housing 300. Upon receiving the indication, PMU 328 may transmit a signal to contactor 320 to enable one or more connections between battery cells 312 and high-power connection 324 to provide energy to electric watercraft. It should be noted that battery pack 308 is exemplary and battery housing 300 may include multiple battery packs (e.g., two, three, four, five). As described herein, battery packs 308 contained within housing 300 may be enable and disabled simultaneously. One of ordinary skill in the art, upon reading this disclosure, would understand that all battery packs 308 contained within the housing 300 would be disabled simultaneously to prevent any electrical malfunction and to ensure safety. Further, it would be understood battery packs 308 contained within the housing 300 would be enabled simultaneously to provide ample power to electric watercraft.

Figure 3C:
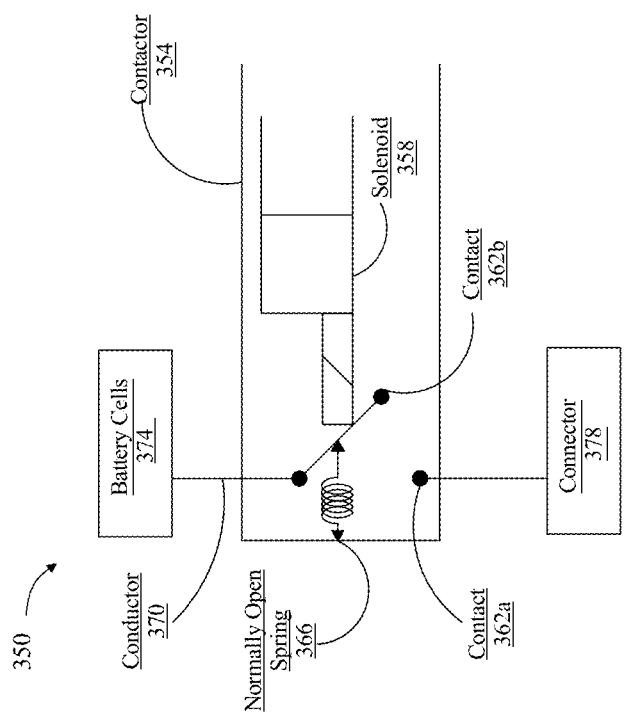
FIG. 3C is a block diagram of an exemplary contactor, in accordance with an embodiment.

Referring now to FIG. 3C, an exemplary system 350 for battery management in a watercraft is illustrated by way of a block diagram. In some embodiments, a contactor 354 may be located within a battery pack. An exemplary solenoid-type contactor 354 is illustrated in FIG. 3C, although contactor 354 may be of any type. Contactor 354 may include a solenoid 358. As used in this disclosure, a "solenoid" is an electromechanical system that uses an electromagnetic force to introduce an electrically controllable movement, for example without limitation a translational movement. In some cases, a solenoid may be normally open or normally closed. Solenoid may be spring loaded, such that when in a state of substantially no electromagnetic force the solenoid is a predetermined position. Solenoid 358 may be configured to switch at least a contact 362a-b. Contacts 362a-b may include any conductive material including without limitation metals. In some cases, contacts 3621a-b may be coated, for instance with a coating that resistant to damage for example, from a resulting arc. For instance coating may have a high thermal resistance, high hardness, or the like. In some cases, contactor 354 may be normally open or normally closed. In some cases, a normal position of contactor 354 may be determined according to a pre-loading. Pre-loading force may be applied by a compliant element 366, such as without limitation a spring 366 or an elastic device 366. Exemplary non-limiting springs 366 include torsion springs, compression springs, coil springs, wave springs, Belleville washers, gas springs, and the like. Spring 366 may be configured to position contacts 362a-b when little or substantially no electromotive force is applied from solenoid 358. Contactor 354 may be configured to provide electrical communication when contacts 362a-b are in physical contact with one another and provide substantially no electrical communication when contacts 362a-b are not in physical contact.

Still referring to FIG. 3C, in some embodiments, contactor 354 may be located substantially within battery pack. For example, contactor 354 may be located in series with a conductor 370 disposed between battery cells 374 and a connector 378. In some cases, system 350 may be configured such that when contactor 354 is permitting electrical communication via conductor 370, battery cells 374 are in electrical communication with a connector 378.

Figure 4:
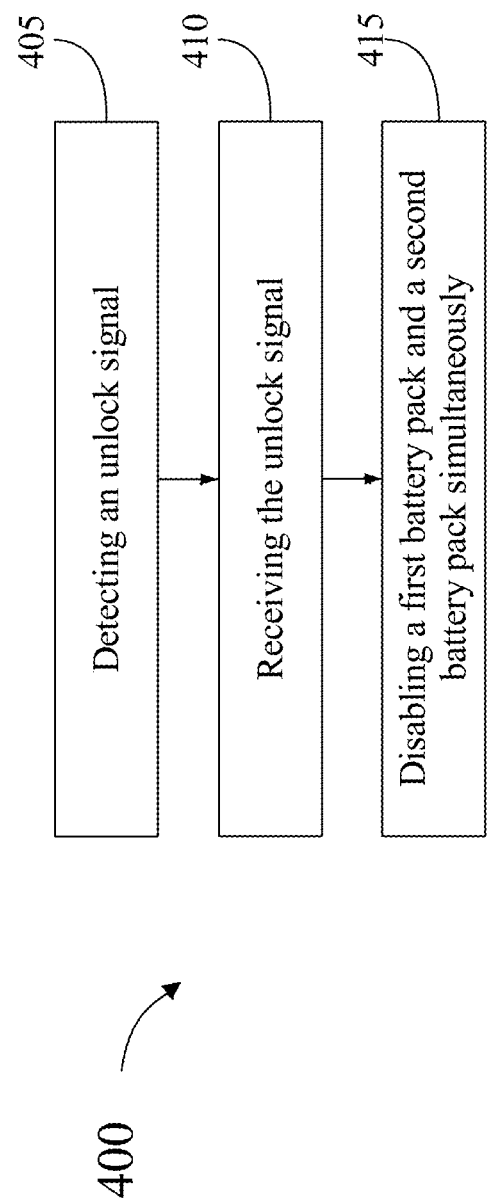
FIG. 4 is a flow diagram illustrating an exemplary method of refueling an electric watercraft, in accordance with an embodiment.

Now referring to FIG. 4, a method 400 for refueling an electric watercraft is shown. An electric watercraft may include any electric watercraft described in this disclosure, for example with reference to FIGS. 1-3C. At step 405, method 400 may include detecting, by one or more sensors, an unlock signal as a function of unlocking a first battery pack from a first receiver. Battery packs may include any battery packs described in this disclosure, for example with reference to FIGS. 1-3C. One or more sensors may include any sensors described in this disclosure, for example with reference to FIGS. 1-3C.

At step 410, method 400 may include receiving, by a computing device, the unlock signal. Computing device may include any computing device described in this disclosure, for example with reference to FIGS. 1-3C.

Still referring to FIG. 4, at step 415, method 400 may include disabling, by the computing device, the first battery pack and a second battery pack simultaneously, in response to receiving the unlock signal. Method 400 may further include disabling the first battery pack using a first contactor and the second battery pack using a second contactor. Battery packs may include any battery packs described in this disclosure, for example with reference to FIGS. 1-3C. Contactors may include contactors described in this disclosure, for example with reference to FIGS. 1-3C.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
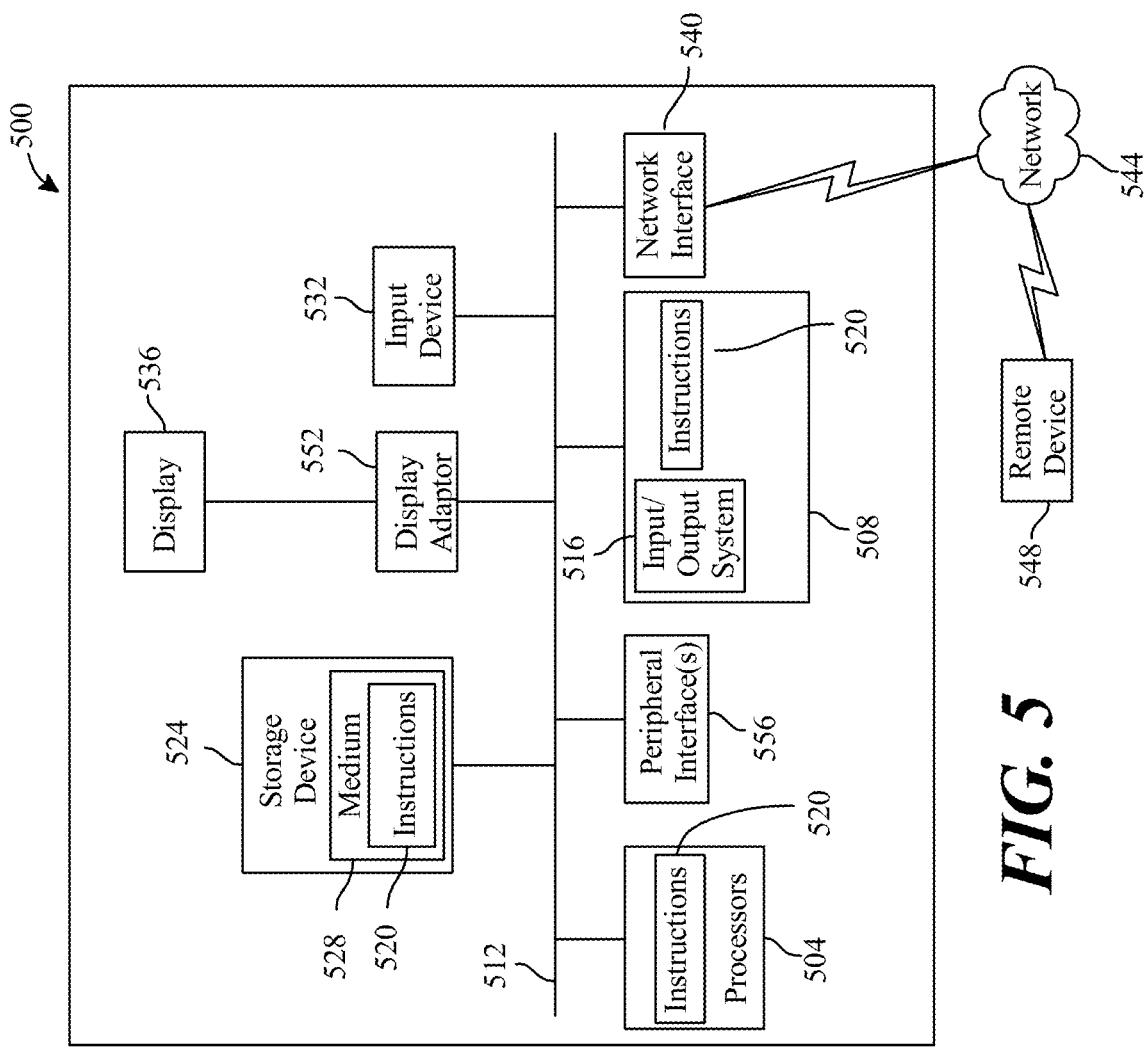
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A method for refueling an electric watercraft, the method comprising:
   detecting, by one or more sensors, an unlock signal as a function of unlocking a first battery pack from a first receiver;
   receiving, by a computing device, the unlock signal; and
   disabling, by the computing device, the first battery pack and a second battery pack, in response to receiving the unlock signal, wherein disabling the first battery pack and the second battery pack further comprises:
   disabling the first battery pack using a first contactor; and
   disabling the second battery pack using a second contactor.

2. The method of claim 1, wherein detecting the unlock signal is in response to a user performing an unlocking maneuver on the first battery pack.

3. The method of claim 1, wherein receiving the unlock signal further comprising receiving the unlock signal from a pressure sensor.

4. The method of claim 1, further comprising detecting, by the one or more sensors, a lock signal as a function of locking a third battery pack into the first receiver.

5. The method of claim 4, further comprising receiving, by the computing device, the lock signal.

6. The method of claim 5, further comprising enabling, by the computing device, a third battery pack and the second battery pack, in response to receiving the lock signal.

7. The method of claim 6, further comprising enabling the third battery pack using a third contactor and enabling the second battery pack using the second contactor.

8. The method of claim 1, wherein disabling the first contactor uses a first battery pack controller and disabling the second contactor uses a second battery pack controller.

9. The method of claim 1, further comprising:
   receiving, by a first battery pack controller, the unlock signal; and
   sending the unlock signal from the first battery pack controller connected to the first battery pack to a communication network.

10. The method of claim 9, further comprising sending, using the communication network, the unlock signal from the first battery pack controller to a second battery pack controller connected to the second battery pack.

11. A system for refueling an electric watercraft comprising:
    one or more sensors, the one or more sensors configured to detect an unlock signal as a function of unlocking a first battery pack from a first receiver;
    a computing device communicatively connected to the one or more sensors and configured to:
    receive the unlock signal; and
    disable the first battery pack and a second battery pack, in response to receiving the unlock signal, wherein disabling the first battery pack and the second battery pack comprises:
    disabling the first battery pack using a first contactor; and
    disabling the second battery pack using a second contactor.

12. The system of claim 11, wherein detecting the unlock signal is in response to a user performing an unlocking maneuver on the first battery pack.

13. The system of claim 11, wherein the one or more sensors comprise a pressure sensor.

14. The system of claim 11, wherein the one or more sensors detect a lock signal as a function of locking a third battery pack into the first receiver.

15. The system of claim 14, wherein the computing device receives the lock signal.

16. The system of claim 15, wherein a third battery pack and the second battery pack are enabled, in response to receiving the lock signal.

17. The system of claim 16, wherein the third battery pack is enabled using a third contactor and the second battery pack is enabled using the second contactor.

18. The system of claim 11, wherein disabling the first contactor uses a first battery pack controller and disabling the second contactor uses a second battery pack controller.

19. The system of claim 11, wherein the computing device is further configured to:
    receive, by a first battery pack controller connected to the first battery pack, the unlock signal; and
    send the unlock signal from the first battery pack controller to a communication network.

20. The system of claim 19, wherein the communication network sends the unlock signal from the first battery pack controller to a second battery pack controller connected to the second battery pack.

* * * * *